United States Patent

Cummings et al.

Patent Number: 5,345,709
Date of Patent: Sep. 13, 1994

[54] TROTLINE AND FISHHOOK HOLDER

[76] Inventors: Jimmie R. Cummings; Martha F. Cummings, both of P.O. Box 54; Ervin J. Mallonee; Christene L. Mallonee, both of 1702 N. Post Rd., all of Chandler, Okla. 74834

[21] Appl. No.: 174,082

[22] Filed: Dec. 28, 1993

[51] Int. Cl.$^5$ ............................................. A01K 97/00
[52] U.S. Cl. ................................................ 43/57.3
[58] Field of Search ....................... 43/57.1, 57.2, 57.3

[56] References Cited

U.S. PATENT DOCUMENTS

| | | | |
|---|---|---|---|
| 2,242,509 | 5/1941 | Coalson | 43/57.3 |
| 3,842,530 | 10/1974 | Jackson | 43/57.3 |
| 4,546,569 | 10/1985 | Thompson, Jr. | 43/57.3 |
| 4,685,243 | 8/1987 | Pugh | 43/57.3 |
| 4,769,941 | 9/1988 | Schmidt | 43/57.1 |
| 5,107,618 | 4/1992 | Cummings et al. | 43/57.3 |
| 5,182,878 | 2/1993 | Clark | 43/57.3 |

*Primary Examiner*—Kurt C. Rowan
*Attorney, Agent, or Firm*—Robert K. Rhea

[57] ABSTRACT

A trotline fishhook and line holder and fishhook guard supported by a handle assembly is formed by an elongated sleeve having one end closed and having a coextensive slot in its wall. A coextensive diametrically disposed baffle-like wall within the sleeve is integral at one longitudinal edge with the sleeve wall adjacent its slot with the opposite longitudinal edge of the wall terminating in spaced relation with respect to the inner wall surface of the sleeve forming a longitudinal support for receiving fishhooks when manually placed within the sleeve with the fishhook inverted and its curved end portion overlying an intermediate portion of the wall. The shank of the fishhook projects outwardly through the sleeve slot. A cap closes the other end of the sleeve. The handle assembly is formed by a rod secured by struts in parallel spaced relation to an elongated section of part circular in cross section tubing wall which resiliently grips a major transverse peripheral portion of the sleeve when placed thereon and supports the line of the trotline when wrapped around the struts.

8 Claims, 1 Drawing Sheet

TROTLINE AND FISHHOOK HOLDER

BACKGROUND OF THE INVENTION

1. Field of the invention

This invention relates to fishing equipment and more particularly to a storage device for the line and fishhooks of trotlines when not in use.

A trotline is a passive form of fishing for game fish and comprises an elongated length of line stretched between two points of anchorage near the surface of a body of water. A plurality of leaders are fastened to the line in spaced-apart relation, each supporting a fishhook for holding fish bait at its depending end below the surface of the water. One of the problems associated with such a trotline is the storage thereof in a safe condition or temporary storage while moving the trotline from one place to another without the fishhooks and leaders becoming entangled or posing a hazard to the handlers thereof.

This invention provides a temporary or permanent storage for the fishhooks and leaders of a trotline when separated from the line which is easily wound around the holder handle.

2. Description of the prior art

The most pertinent prior patent is believed to be our U.S. Pat. No. 5,107,618 issued Apr. 28, 1992 for TROTLINE FISHHOOK HOLDER.

This patent discloses a fishhook holder and guard formed by an elongated sleeve having a coextensive wall slot and one end closed by a base cap. The sleeve supports an elongated coextensive rod disposed adjacent its inner wall surface, opposite the position of the slot, for receiving fishhooks when manually placed within the sleeve, when inverted and with its shank end portion projecting outwardly through the wall slot. A second cap normally closes the open end of the sleeve.

This invention is distinctive over our patent by providing an elongated fishhook holding sleeve having a coextensive wall slot and a baffle-like coextensive partition wall integral, by one longitudinal edge, with the sleeve wall adjacent its slot. The opposite longitudinal edge of the partition wall is disposed in spaced relation with respect to the inner wall surface of the sleeve substantially diametrically opposite the slot for receiving the hook end portion of a fishhook with its shank projecting outwardly through the slot.

This hook holder further includes a handle assembly around which the trotline, per se, is wrapped after placing the fishhooks in the sleeve and includes a section of tubing which resiliently grips the periphery of the sleeve for transporting the trotline as a unit.

SUMMARY OF THE INVENTION

An elongated sleeve is provided with a coextensive longitudinal slot in its wall capable of freely receiving the shank of a trotline hook. A cap permanently closes one end of the sleeve.

A coextensive baffle-like partition integral at one longitudinal edge with the sleeve wall adjacent its slot. The opposite edge of the partition wall is disposed adjacent the inner wall surface of the sleeve opposite its slot. The partition supports individual trotline fishhooks when inverted and placed thereon with the shank of the respective fishhook projecting outwardly through the sleeve slot.

A handle assembly is longitudinally secured to a section of tubing, part circular in transverse section, by a pair of struts around which the trotline, per se, minus the hooks, is wrapped for storage and transporting.

The part circular tubular section resiliently grips a major peripheral portion of the sleeve and an intermediate portion of the respective fishhook leader when partially wrapped around the sleeve, forming a unitary assembly for storage and transport.

The principal object of this invention is to provide a holder and storage device including a handle assembly on which the line, per se, of a trotline is wound and including a wall divided sleeve assembly which surrounds the major portion of trotline fishhooks when the fishhooks are juxtaposed within the holder which eliminates any danger of the hook portion of a fishhook being exposed while supported by the holder.

DESCRIPTION OF THE PREFERRED EMBODIMENTS

Figure 1:
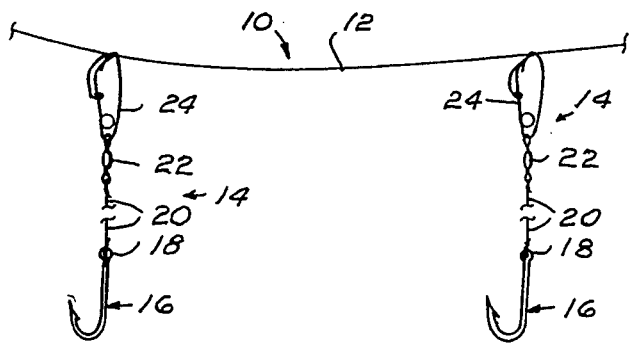
FIG. 1 is a fragmentary perspective view of a trotline.

Like characters of reference designate like parts in those figures of the drawings in which they occur.

In the drawings:

The reference numeral 10 indicates a fragment of a trotline 12 having a plurality of trotline fishhook assemblies 14 secured thereto in depending operative relation with the trotline 12 extended across a body of water, not shown, and anchored at its respective ends.

Each of the trotline hook assemblies 14 comprise a fishhook 16 commonly referred to as a No. 7 fishhook. The eye 18 of the fishhook is connected with a leader 20 of selected length in turn connected at its opposite end with a fishing line swivel 22 in turn secured to a spring clip 24 frictionally gripping the trotline 12.

The length of the fishhook assembly 14 and its spacing with respect to the next adjacent fishhook assembly 14 is selected in accordance with the desired distance of the fishhook from the line 12 so that one fishhook assembly 14 will not normally become entangled with another or adjacent fishhook assembly.

The reference numeral 25 indicates the fishhook holder comprising an elongated sleeve 26, such as a selected length and diameter of plastic pipe or the like, closed at one end as by a cap 27 and opened at its other end. The sleeve 26 is provided with a coextensive slot 28 in its wall of sufficient width to freely receive, in sliding relation, the shank of one of the fishhooks 16 as presently explained.

The sleeve 26 is provided with a diametrically disposed coextensive baffle-like partition wall 30 preferably integral at one end portion and by longitudinal edge with the sleeve wall adjacent its slot 28.

The opposite longitudinal edge 34 of the wall 30 is disposed in selected spaced-apart relation with respect to the inner wall surface of the sleeve substantially diametrically opposite the slot 28. The spacing between the wall edge 34 and the inner wall surface freely receives the curved portion of a fishhook connecting its shank with its hook when the fishhook shank axis is substantially parallel with the wall 30 and manually moved into the slot 28.

A cap 36 closes the open end of the sleeve after the fishhooks 16 are placed therein. The cap wall 38 is provided with an inwardly projecting pin 40 diametrically equal with the width of the sleeve slot 28 for entering its adjacent end portion to maintain the sleeve wall portion adjacent its open end, concentric with its longitudinal axis for insuring a cooperative frictional fit of the inner wall surface of the cap 36 and handle assembly portion 44 with the periphery of the sleeve for the reason believed presently explained.

The holder 25 further includes a rod-like handle 42 connected in parallel spaced-apart relation with a section of tubing, such as plastic pipe 44, by a pair of struts 46 adjacent each end of the handle 42. The spaced-apart struts 46 form a support around which the trotline 12, per se, is wrapped for storage or transporting.

The section of tubing 44 is longtudinally substantially equal to the spacing between the sleeve closed end 27 and cap 36 when the latter is in place. Transversely the section of tubing 44 is part circular in cross section extending through slightly more than 180° and is capable of being flexed outwardly at its respective longitudinal edge portions and returning to a position of repose when released which permits the section 44 to be manually forced over a peripheral portion of the sleeve 26 with the leaders 20 impinged between the sleeve and the section 44, thus, securely joining the sleeve to the handle assembly.

Operation

Figure 4:
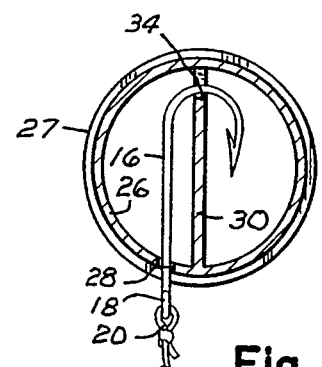
FIG. 4 is a vertical cross sectional view taken substantially along the line 4—4 of FIG. 2.
Figures 2, 5:
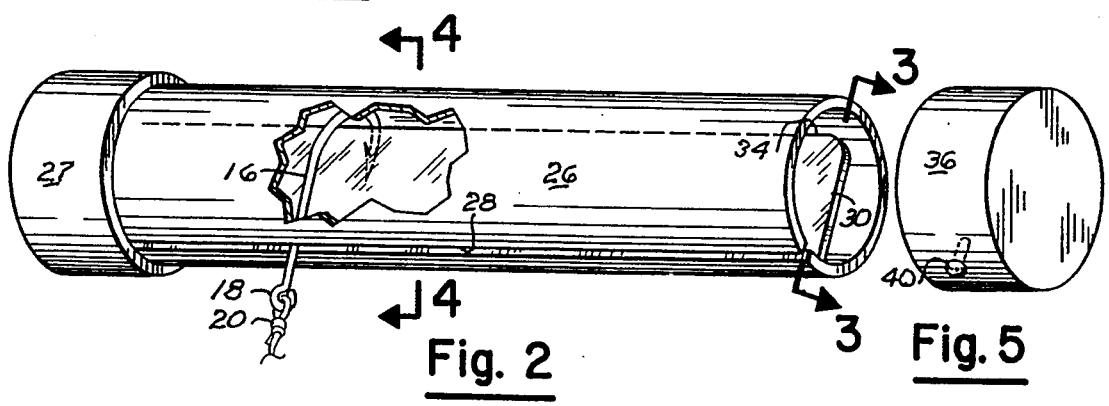
FIG. 2 is a perspective view of the fishhook supporting sleeve with a portion of its wall broken away for clarity.
FIG. 5 is a perspective view of the sleeve open end cap.
Figure 3:
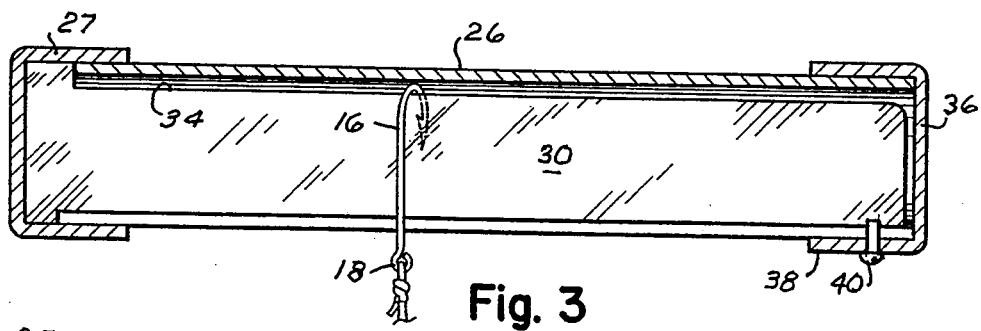
FIG. 3 is a longitudinal cross sectional view taken substantially along the line 3—3 of FIG. 2.
Figure 6:
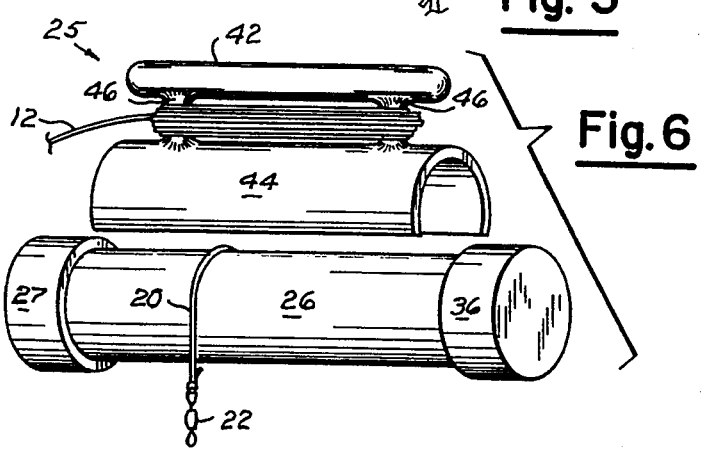
FIG. 6 is a partially exploded perspective view of the holder, to a smaller scale.

As each trotline assembly 14 is removed from the trotline 12, the fishhook 16 is manually grasped by its shank and inverted from the position shown by FIG. 1 and while inverted is manually moved laterally into the open end of the sleeve, after removing the cap 36, so that the arcuate bend in the fishhook, between its shank and its hook end, transversely overlies the edge of the partition wall 30 and the shank of the fishhook extends outwardly of the sleeve through the slot 28 (FIG. 4). Each leader 20, depending from the sleeve, when the fishhook is supported therein is partially wrapped around the periphery of the sleeve.

The spacing between the partition wall edge and the inner wall surface of the sleeve 26 is such that the arcuately curved end portion of the fishhook may be freely moved longitudinally of the sleeve but is insufficient for the fishhook to be removed in a lateral direction from the wall 30 except by separating the fishhook from the sleeve and wall through the sleeve open end.

The remaining fishhook assemblies 14 are removed from the trotline 12 in succession and the fishhooks placed within the sleeve on the wall 30 and the learders partially wrapped around the sleeve 26 as just described. The tubing section 44 is then manually forced into gripping relation around a peripheral portion of the sleeve, thus, impinging the leaders between the sleeve and the section 44 as described hereinabove. The trotline 12 is then wrapped around the struts 46 to complete the stored assembly of the trotline 10.

To place the stored trotline in the operative position of FIG. 1, the above described storing procedure is simply reversed.

Obviously the invention is susceptible to changes or alterations without defeating its practicability. Therefore, we do not wish to be confined to the preferred embodiment shown in the drawings and described herein.

We claim:

1. A trotline holder, comprising:
   an elongated sleeve having one end closed and having a substantially coextensive wall slot;
   a coextensive diametrically disposed wall within said sleeve having one longitudinally extending edge integral with the wall of the sleeve adjacent the slot and having its opposite longitudinally extending edge surface terminating in close spaced relation with respect to the the inner wall surface of the sleeve for supporting the hook end portion of a plurality of fishhooks in juxtaposed relation with the shank portion of each fishhook projecting outwardly through the sleeve slot; and,
   handle means transversely frictionally gripping a major portion of the sleeve periphery opposite the slot for preventing unauthorized separation of the fishhooks from the sleeve.

2. The trotline holder according to claim 1 in which the handle means includes:
   an elongated section of tubular wall characterized by a coextensive transversely concave recess radially complementary receiving an arc of the periphery of said sleeve at least greater than 180°; and,
   a rod secured to said tubular wall in parallel spaced relation.

3. The trotline holder according to claim 2 and further including:
   a strut interposed between the respective end portion of said rod and the tubular wall.

4. The trotline holder according to claim 2 and further including:
   cap means closing the other end of said sleeve for maintaining the wall of said sleeve oppposite its closed end concentric with its longitudinal axis.

5. In a holder for a trotline including a support line having a plurality of fishhooks releasably connected therewith in spaced-apart relation longitudinally of the line by a like plurality of fishhook leaders, the improvement comprising:
   an elongated sleeve having one end closed and having a substantially coextensive wall slot;
   a coextensive diametrically disposed wall within said sleeve rigidly secured by one longitudinally extending edge to the inner wall surface of the sleeve adjacent the slot and having its opposite longitudinally extending edge surface terminating in close spaced relation with respect to the the inner wall surface of the sleeve for supporting the hook end portion of juxtaposed fishhooks with the shank portion of each fishhook projecting outwardly through the sleeve slot and the respective fishhook leader end portion opposite the fishhook at least partially wrapped around the periphery of the sleeve; and,
   handle means transversely frictionally gripping a major portion of the sleeve periphery opposite the slot and an intermediate portion of the respective fishhook leader for preventing unauthorized separation of the fishhooks from the sleeve.

6. The trotline holder according to claim 5 in which the handle means includes:
   an elongated section of tubular wall characterized by a coextensive transversely concave recess radially complementary receiving an arc of the periphery of said sleeve at least greater than 180°; and,
   a rod secured in parallel spaced relation to said tubular wall opposite the concave recess.

7. The trotline holder according to claim 6 and further including:
   a strut interposed between and securing the respective end portion of said rod to the tubular wall for storing the support line when wrapped around the strut.

8. The trotline holder according to claim 6 and further including:
   cap means closing the other end of said sleeve for maintaining the wall of said sleeve oppposite its closed end concentric with its longitudinal axis.

* * * * *